UNITED STATES PATENT OFFICE.

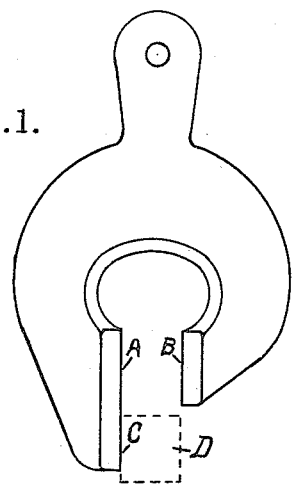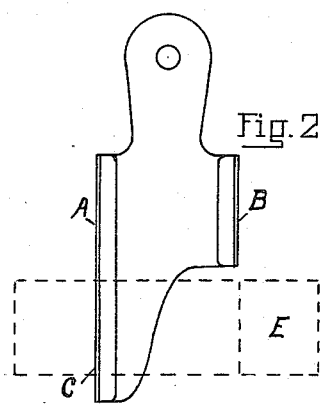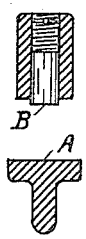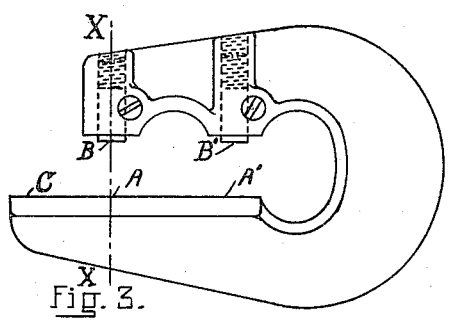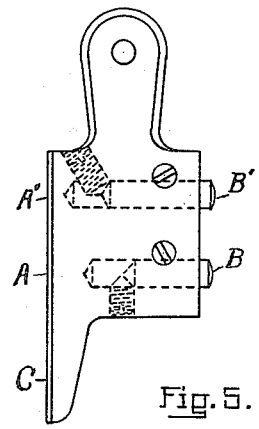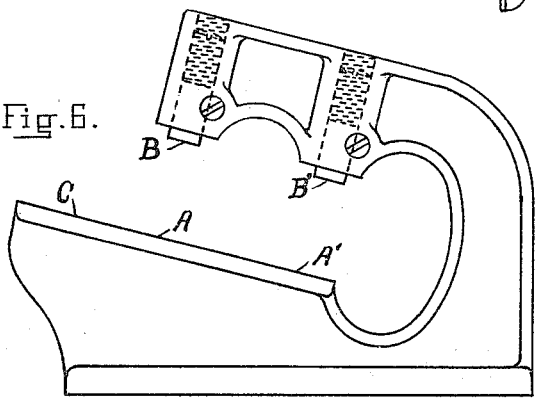

FRED B. COREY, OF EDGEWOOD, PENNSYLVANIA.

INSPECTOR'S GAGE.

1,152,792.      Specification of Letters Patent.      Patented Sept. 7, 1915.

Application filed December 2, 1914. Serial No. 875,059.

*To all whom it may concern:*

Be it known that I, FRED B. COREY, a citizen of the United States, residing at Edgewood, in the county of Allegheny and State of Pennsylvania, have invented certain new and useful Improvements in Inspectors' Gages, of which the following is a specification.

My invention relates to inspectors' gages and especially to those gages known as external and internal caliper or snap gages, and it is applicable to such gages having a single pair of coacting gage surfaces or to those known as limit gages which have their gage surfaces arranged to determine if the dimension gaged is between specified minimum and maximum limits.

The object of my invention is to provide a gage that will permit greater rapidity in its use without any sacrifice of sensitiveness of touch, and thus to increase the efficiency of the inspector using my invention.

My invention consists of the addition to a gage of the usual construction of an extension of one of the gage surfaces so as to form a guide, so that the material to be gaged will approach the gage in the proper position and at the proper angle for correct gaging.

In the drawings which illustrate my invention, Figure 1 shows a side view of a plain external caliper gage. Fig. 2 is a side view of a plain internal caliper gage. Fig. 3 shows a side view of an external adjustable limit gage and Fig. 4 shows a section of the same gage through the line X—X of Fig. 3. Fig. 5 is a side view of an internal adjustable limit gage. Fig. 6 shows a side view of a stationary form of gage similar to the gage illustrated in Fig. 3.

In the drawings of the different types of gages, A and B represent, in each case, the two coacting gage surfaces, while A′ and B′ represent the secondary coacting gage surfaces of the limit gages. No claim is made to originality in the form, arrangement or construction of these gage surfaces, except that in each case the surface A is extended to form the guide surface C. It is the addition of this guide surface C, to gages of various commercial forms, that is the basis of my invention.

In the use of my invention, the inspector will first bring the guide surface C and the piece to be gaged into contact and into the proper angular relation. This preliminary relation will be better understood by reference to Fig. 1, in which D indicates, in dotted outline, a section of a rectangular bar in its preliminary position with respect to the plain external caliper gage, and to Fig. 2, in which E indicates, in dotted outline, a ring, the bore of which is in its preliminary position with respect to the plain internal caliper gage. After the gage and the material to be gaged are placed in proper relation by means of the guide surface C, the gage is moved so as to bring the material into the proper relation to the gage surfaces A and B, by a sliding movement along the guide surface C. Aside from this action of the guide surface C, the gaging operation, with gages embodying my invention, does not differ from the same operation when gages of the usual construction are employed.

I do not desire to limit myself to the exact construction and arrangement of parts here shown, but aim in the appended claims to cover all modifications which are within the scope of my invention.

What I claim as new and desire to secure by Letters Patent of the United States is—

1. A gage having two edges carrying coöperating gage surfaces, one of said edges being continuous or unbroken and projecting beyond the limits of the other to permit of the transverse application of the gage to the object to be measured and to serve as a longitudinal guide.

2. A gage having two edges carrying coöperating gage surfaces, one of said edges carrying non-continuous gage surfaces, the other being continuous or unbroken and projecting beyond the limits of the first to permit of the transverse application of the gage to the object to be measured and to serve as a longitudinal guide.

In witness whereof, I have hereunto set my hand this first day of December, 1914.

FRED B. COREY.

Witnesses:
    Jos. A. BROOKS,
    ALEX PAFF.

Copies of this patent may be obtained for five cents each, by addressing the "Commissioner of Patents, Washington, D. C."